United States Patent
Thompson

(10) Patent No.: US 11,353,548 B2
(45) Date of Patent: Jun. 7, 2022

(54) RELATING TO RADAR APPARATUS

(71) Applicant: TRW Limited, Solihull (GB)

(72) Inventor: Martin John Thompson, Solihull (GB)

(73) Assignee: TRW Limited, Solihull (GB)

(*) Notice: Subject to any disclaimer, the term of this patent is extended or adjusted under 35 U.S.C. 154(b) by 235 days.

(21) Appl. No.: 16/392,078

(22) Filed: Apr. 23, 2019

(65) Prior Publication Data
US 2019/0346535 A1    Nov. 14, 2019

(30) Foreign Application Priority Data

Apr. 23, 2018    (GB) ...................... 1806593

(51) Int. Cl.
*G01S 7/35*    (2006.01)

(52) U.S. Cl.
CPC .............. *G01S 7/352* (2013.01); *G01S 7/356* (2021.05)

(58) Field of Classification Search
CPC ....................................... G01S 7/356
USPC ......................................... 342/196
See application file for complete search history.

(56) References Cited

U.S. PATENT DOCUMENTS

| | | | | |
|---|---|---|---|---|
| 5,563,603 A * | 10/1996 | Aker | ............ | G01S 13/92 342/115 |
| 9,203,466 B2 * | 12/2015 | Gorokhov | ............ | H04B 1/7075 |
| 10,158,394 B2 * | 12/2018 | Hadani | ............ | H04L 27/2627 |
| 2005/0129139 A1 * | 6/2005 | Jones | ............ | G01S 5/14 375/295 |
| 2010/0027486 A1 * | 2/2010 | Gorokhov | ............ | H04B 1/7075 370/329 |
| 2015/0346321 A1 * | 12/2015 | Jansen | ............ | G01S 7/02 342/107 |
| 2016/0033631 A1 * | 2/2016 | Searcy | ............ | G01S 13/18 342/132 |
| 2016/0282458 A1 * | 9/2016 | Nugraha | ............ | G06F 13/28 |
| 2017/0157750 A1 * | 6/2017 | Koenes | ............ | B25B 23/0085 |
| 2017/0363711 A1 * | 12/2017 | Rao | ............ | H04B 15/02 |
| 2018/0045810 A1 * | 2/2018 | Ygnace | ............ | G01S 7/2927 |
| 2018/0095173 A1 * | 4/2018 | Kurono | ............ | G01S 13/584 |
| 2019/0383925 A1 * | 12/2019 | Gulati | ............ | G01S 7/023 |

OTHER PUBLICATIONS

European Search Report, Application No. 19169926.3, dated Jul. 19, 2019.
Great Britain Patents Act 1977: Search Report under Section 17(5), Application No. GB 1806593.8, dated Oct. 22, 2018.

* cited by examiner

*Primary Examiner* — Bernarr E Gregory
*Assistant Examiner* — Nuzhat Pervin
(74) *Attorney, Agent, or Firm* — MacMillan, Sobanski & Todd, LLC

(57) ABSTRACT

A method of operating a radar apparatus comprises: (a) capturing a first chirp of data in the cycle and storing the data in a local storage memory; (b) processing the captured data to generate a set of range bin data, (c) transferring the range bin data from the local storage memory to a remote burst access memory, (d) repeating the steps (a) and (b) for each subsequent chirp, (e) repeating step (c) so as to transfer the range bin data from the local storage memory to the remote burst access memory, (f) transferring from the remote burst access memory into the local storage memory, (g) process the data transferred into the local storage memory to generate a set of velocity data, and repeating steps (f) and (g) until all of the data in the remote burst access memory block of data has been processed by the second FFT.

11 Claims, 8 Drawing Sheets

| Address | Chirp 0 | Chirp 1 | ... | Chirp 511 |
|---|---|---|---|---|
| 0x00000000 | C0A0R0->C0A15R0 C0A0R1->C0A15R1 | C0A0R0->C0A15R0 C0A0R1->C0A15R1 | ... | C0A0R0->C0A15R0 C0A0R1->C0A15R1 |
| 0x00000080 | | C1A0R0->C1A15R0 C1A0R1->C1A15R1 | ... | C1A0R0->C1A15R0 C1A0R1->C1A15R1 |
| 0x00000100 | | | ... | C2A0R0->C2A15R0 C2A0R1->C2A15R1 |
| 0x00000180 | | | ... | C3A0R0->C3A15R0 C3A0R1->C3A15R1 |
| | | | ... | |
| 0x0000FF00 | | | ... | C510A0R0->C510A15R0 C510A0R1->C510A15R1 |
| 0x0000FF80 | | | ... | C511A0R0->C511A15R0 C511A0R1->C511A15R1 |
| 0x00010000 | C0A0R2->C0A15R2 C0A0R3->C0A15R3 | C0A0R2->C0A15R2 C0A0R3->C0A15R3 | ... | C0A0R2->C0A15R2 C0A0R3->C0A15R3 |
| 0x00010080 | | C1A0R2->C1A15R2 C1A0R3->C1A15R3 | ... | C1A0R2->C1A15R2 C1A0R3->C1A15R3 |
| 0x00010100 | | | ... | C2A0R2->C2A15R2 C2A0R3->C2A15R3 |
| 0x00010180 | | | ... | C3A0R2->C3A15R2 C3A0R3->C3A15R3 |
| | | | ... | |
| 0x00FF0000 | C0A0R510->C0A15R510 C0A0R511->C0A15R511 | C0A0R510->C0A15R510 C0A0R511->C0A15R511 | ... | C0A0R510->C0A15R510 C0A0R511->C0A15R511 |
| 0x00FF0080 | | C1A0R510->C1A15R510 C1A0R511->C1A15R511 | ... | C1A0R510->C1A15R510 C1A0R511->C1A15R511 |
| 0x00FF0100 | | | ... | C2A0R510->C2A15R510 C2A0R511->C2A15R511 |
| 0x00FF0180 | | | ... | C3A0R510->C3A15R510 C3A0R511->C3A15R511 |
| | | | ... | |
| 0x00FFFF00 | | | ... | C510A0R510->C510A15R510 C510A0R511->C510A15R511 |
| 0x00FFFF80 | | | ... | C511A0R510->C511A15R510 C511A0R511->C511A15R511 |

Figure 3

| | 1 Burst | |
|---|---|---|
| 0x00000000 | C0A0R0->C0A15R0 | C0A0R1->C0A15R1 |
| 0x00000080 | C1A0R0->C1A15R0 | C1A0R1->C1A15R1 |
| 0x00000100 | C2A0R0->C2A15R0 | C2A0R1->C2A15R1 |
| 0x00000180 | C3A0R0->C3A15R0 | C3A0R1->C3A15R1 |
| | ... | |
| 0x0000FF00 | C510A0R0->C510A15R0 | C510A0R1->C510A15R1 |
| 0x0000FF80 | C511A0R0->C511A15R0 | C511A0R1->C511A15R1 |
| 0x00010000 | C0A0R2->C0A15R2 | C0A0R3->C0A15R3 |
| 0x00010080 | C1A0R2->C1A15R2 | C1A0R3->C1A15R3 |
| 0x00010100 | C2A0R2->C2A15R2 | C2A0R3->C2A15R3 |
| 0x00010180 | C3A0R2->C3A15R2 | C3A0R3->C3A15R3 |
| | ... | |
| | ... | |
| 0x00FF0000 | C0A0R510->C0A15R510 | C0A0R511->C0A15R511 |
| 0x00FF0080 | C1A0R510->C1A15R510 | C1A0R511->C1A15R511 |
| 0x00FF0100 | C2A0R510->C2A15R510 | C2A0R511->C2A15R511 |
| 0x00FF0180 | C3A0R510->C3A15R510 | C3A0R511->C3A15R511 |
| | ... | |
| 0x00FFFF00 | C510A0R510->C510A15R510 | C510A0R511->C510A15R511 |
| 0x00FFFF80 | C511A0R510->C511A15R510 | C511A0R511->C511A15R511 |

| | |
|---|---|
| 0x00000000 | C0A0R0->C0A15R0 |
| 0x00000080 | C1A0R0->C1A15R0 |
| 0x00000100 | C2A0R0->C2A15R0 |
| 0x00000180 | C3A0R0->C3A15R0 |
| ... | |
| 0x0000FF00 | C510A0R0->C510A15R0 |
| 0x0000FF80 | C511A0R0->C511A15R0 |

| | |
|---|---|
| 0x00000000 | C0A0R1->C0A15R1 |
| 0x00000080 | C1A0R1->C1A15R1 |
| 0x00000100 | C2A0R1->C2A15R1 |
| 0x00000180 | C3A0R1->C3A15R1 |
| ... | |
| 0x0000FF00 | C510A0R1->C510A15R1 |
| 0x0000FF80 | C511A0R1->C511A15R1 |

Figure 7

| | |
|---|---|
| 0x00000000 | C0A0R2->C0A15R2 |
| 0x00000080 | C1A0R2->C1A15R2 |
| 0x00000100 | C2A0R2->C2A15R2 |
| 0x00000180 | C3A0R2->C3A15R2 |
| ... | |
| 0x0000FF00 | C510A0R2->C510A15R2 |
| 0x0000FF80 | C511A0R2->C511A15R2 |

| | |
|---|---|
| 0x00000000 | C0A0R3->C0A15R3 |
| 0x00000080 | C1A0R3->C1A15R3 |
| 0x00000100 | C2A0R3->C2A15R3 |
| 0x00000180 | C3A0R3->C3A15R3 |
| ... | |
| 0x0000FF00 | C510A0R3->C510A15R3 |
| 0x0000FF80 | C511A0R3->C511A15R3 |

Figure 8

RELATING TO RADAR APPARATUS

CROSS-REFERENCE TO RELATED APPLICATIONS

This application is a national stage of Great Britain Patent Application No. 1806593.8, filed 23 Apr. 2018, the disclosures of which are incorporated herein by reference in entirety.

BACKGROUND TO THE INVENTION

This invention relates to improvements in FMCW radar apparatus, in particular for mounting to a vehicle such as a car or truck.

It is known to use radar in the measurement of distance. In one application radiation in the microwave region of the spectrum is emitted from a source towards a target. The target will reflect some of this radiation back towards a detector, which is sensitive to radiation in the microwave region of the spectrum. A microcontroller may then be used to make a comparison between the emitted signal and the measured, detected, signal from which the range of the target from the source/detector can be estimated.

A radar apparatus mounted to a vehicle may be used to detect the presence of objects around the vehicle, which may be used as part of a vehicle autonomous or semi-autonomous system such as active cruise control.

It is known to provide a frequency shift key scheme to determine the range/distance from the signals. Distance can be measured from the phase difference that is seen in the returned signal when the emitted signal is modulated by a small step change in frequency. The accuracy of the measurement is related to the frequency step size. Similarly, the relative velocity can be measured by looking at the change in phase shift between closely spaced chirps There has been a significant amount of development work in the field of radar systems, and many types of radar transmission techniques are available. One technique that has proven suitable for automotive applications is known as Frequency Modulated Continuous Wave (FMCW) radar. In an FMCW radar, the frequency of a signal transmitted by an antenna array is ramped up or down over a range of frequencies defining a chirp. This can be produced relatively simply using voltage controlled oscillator (VCO). The data collected from each chirp will comprise a set of perhaps 1024 data samples for each antenna in the array. The antenna array can be of any suitable size, such as 16 antenna radar array. These data samples may then be processed using a discrete Fourier Transform to determine values for a set of range bins for the chirp. These may then be processed together with range bin values for a series of chirps to produce a final set of velocity bin data for the radar apparatus.

In a practical implementation, each chirp offers a set of range measures. The output of a MT taken on the chirps is a set of complex range bins, the frequency and phase of which indicates a precise range. As the range changes from one chirp to the next (due to relative motion) the phase (and ultimately frequency) changes between chirps.

By performing an Fourier Transform, such as a Fast Fourier Transform (FFT) across the consecutive chirps in a given range bin, it is possible to extract frequency (i.e. the rate of change of phase with time), which is related to relative velocity.

A typical FMCW radar apparatus includes a microcontroller that performs the function of processing the data from the antenna, usually using a Fast Fourier Transform (FFT) or sequence of FFTs. The microcontrollers include an amount of fast access memory typically integrated onto the same chip as the processing unit—typically a programmable logic controller. This memory is referred to herein as a local storage memory. This local storage memory is physically close to the processor core of the programmable logic controller and therefore faster to read and write from. It is used for the short term storage of data that is being processed during operation of the apparatus.

The system also includes an external memory, referred to herein as a remote burst access memory, which is located physically further from the processing unit outside of the main processing element chip and thus slower to read from and write to. This memory is usually provided as a dedicated memory chip and communicates with the processing unit across a memory bus. The remote burst access memory also is typically constrained so that data can efficiently be written or read out in bursts of a fixed line length. Truly random access (which is desirable for FFT operations) is very inefficient, and reduces performance compared with burst access memory.

The local storage memory is designed to be truly random access but the remote memory is designed to allow a series of bursts of memory, each burst comprising a line of data of fixed length, to be transferred to the local storage memory on a request made across the memory bus. A burst may consist of a data line that is at least 2 bytes or more bytes of data in length. A sequence of bursts may be written into any number of rows of memory, but typically it is fastest to write a sequence of bursts that correspond to a block of contiguous rows in the memory.

A problem with prior art radar apparatus is that to achieve a good resolution over a wide range of distances, a very large amount of data must be captured and processed. This will often exceed the amount of high speed local memory that is available to the processor, requiring data to be transferred out to a remote memory during the signal processing and later transferred back in for more processing. Because this transfer is relatively slow, the overall speed of the radar in generating range data will be limited. Providing enough high speed local memory to avoid having to do this is at the time of writing is not cost effective.

SUMMARY OF THE INVENTION

A feature of the present invention is to ameliorate the limitations present in prior art methods of processing radar data where a large volume of data is being processed.

According to a first aspect the invention provides a method of operating a radar apparatus of the kind comprising an antenna array of N antennas, a processing unit which receives data captured from the antenna array and includes an area of local storage memory and a larger area of remote burst access memory, the method comprising for a single cycle of the radar comprising two or more chirps of transmitted radar frequency signal:

(a) capturing a first chirp of data in the cycle which generates D data samples from each of N antennas and storing the data in a local storage memory, (b) processing the captured data using a Fourier Transform to generate a set of range bin data, one for each antenna, where each set comprises R range bins, (c) transferring in a sequence of bursts the range bin data for the chirp from the local storage memory to a remote burst access memory where the data is arranged in a grid pattern, the grid pattern comprising data filled rows containing two or more unique range bins of data for the chirp held in a continuous strip of the remote burst access memory, the data filled rows being separated vertically from adjacent data filled rows by multiple rows which do not contain any bursts of data associated with the chirp, (d) repeating the steps (a) and (b) for each subsequent chirp of data in the cycle, (e) repeating step (c) after the range bin data for each subsequent chirp has been stored in the local storage memory so as to transfer in a sequence of bursts the range bin data for each subsequent chirp of data from the local storage memory to the remote burst access memory where the data is arranged in the same grid pattern used for step (c) but offset vertically by one or more rows to fit within the rows in the column that have not been written with data for any previously processed chirp in the cycle, (f) transferring from the remote burst access memory into the local storage memory, in one or more bursts, at least one continuous vertical block of data from the remote block that has a length equal to the number of different range bins, (g) process the data transferred into the local storage memory using a Fourier Transform to generate a set of velocity data comprising a set of velocity bins where each velocity-bin is generated from the values of the corresponding range bin for every antenna of the array, and repeating steps (f) and (g) until all of the data in the remote burst access memory block of data has been processed by the second FFT.

The applicant has appreciated that by transferring data across from the fast local storage memory to the remote burst access memory in a repeating pattern of single data lines for each chirp prior to all of the Fourier Transforms for being taken for all the chirps in a cycle it is possible to use much less local storage memory compared to prior art arrangements that take an FFT for all the chirps before transferring data.

By storing the data in the remote memory in blocks, with each block corresponding to one chirp, a fast transfer back to the local memory is possible. The storage in blocks is achieved in a very efficient manner by processing one chirp at a time in the local storage memory and writing out to spaced locations in the remote memory to form a grid, and then repeating to interleave the data.

The method in step (f) may transfer all of the data corresponding to one chirp as a single burst. This is possible because the data is all present in one continuous vertical block in the remote memory, which is far faster than having to burst out the data in lots of individual bursts.

The method may in steps (c) and (e) store the data in the burst access memory in chirp order when scanning vertically down the memory block.

The method may transfer in steps (c) and (e) data in bursts having a length of at least 2 bytes up to N bytes where N is an integer value less than the total number of antenna. The number of bytes that can be transferred each time depends on the available burst length versus the length of each byte of data.

The method may comprise in steps (c) and (e) transferring the data as a sequence of bursts to form the pattern of data in the remote burst access memory, with each burst containing the data for at least one respective pair of range bins of the range bin set, with the data for one range bin being written into a left part of the column in the grid and for the second range bin being written into a right part of the column.

The sequence used in steps (c) and (e) may transfer a first single burst corresponding to range bins 0 and 1, followed by a subsequent single burst corresponding to range bins 2 and 3, and so on until all the range bins are transferred to the remote memory to form the pattern of stored data.

Thus, reading horizontally across the row for each entry in the column of data there will be the values for two range bins, one after the other.

To maximise speed of data transfer, the step (b) may comprise writing the range bin values generated by the Fourier Transform into the fast local memory with each pair of range bins of the range bin set saved as a single data line, with the values for the first data bin in the left half and the values of the second data bin in the right half.

If more than two range bins will fit in a burst the speed can be increased by transferring three or more range bins at a time in each burst in step (c).

The method may be used for cycles comprising more than two chirps simply by repeating steps (a) and (b) as many times as there are chirp and then repeating step (c) for each chirp with the appropriate vertical offset of the grid. It may be applied to a total of 512 chirps in each cycle for example.

Steps (c) and (e) may each comprise transferring the data into a grid whereby all of the data is held in a single column of width equal to the burst length. This column may store the range bin values for all of the chirps in a cycle in a single column. The column may therefore by two or more bytes in width.

Where there are R range data bins, the data may be arranged in a pattern in the remote memory after the data for a cycle of chirps has been transferred so that all of the even range bin data is in the left hand side of a burst-sized data line in the remote block of data and all of the odd range bin data is in the remote block of data stored in the right hand side of the burst sized data line.

To achieve this, in step (c) data may be stored in the remote memory in a pattern whereby the is a large gap left between subsequent single burst lines that is equal to C−1 rows, ensuring that all of the following repeats of step (f) will interleave into the gaps without overwriting any of the previously transferred data from step (c) or step (f).

In a preferred arrangement, after all the data has been transferred into the remote memory it may form a block of data which has no blank rows, and in which scanning down a column of the block all of the data values for the N antenna for a given range bin are stored sequentially.

The block of data may be stored in a single column. This may in some cases allow the data to be read back in longer single bursts which is possible with some remote burst access memory types for even more efficiency.

The steps (f) and (g) may be performed with each cycle only once all of the data bin values for all antenna and all chirps have been transferred to the remote memory.

In a preferred arrangement, the method may be applied to a radar apparatus where there are N=16 antennas in the antenna array, which can be identified as A0 . . . A15. There may be D=1024 real-valued data samples in each chirp for each antenna with each data sample numbered D0 . . . D1023 corresponding to a different frequency in the chirp. Alternatively the method may generate D/2 complex-valued data samples.

The first FFT performed in step (b) may generate R complex-valued range bins for each chirp, where R is by definition D/2. This will result in 256 data lines in the remote block of data for each set of range bin data with the odd ranges on the right of each data line and the even on the left.

The first Fourier Transform step may comprise a Fast Fourier Transform of the type described in the text book by Cooley, James W., and John W. Tukey, 1965, "An algorithm for the machine calculation of complex Fourier series," *Math. Comput.* 19: 297-301.

Similarly, the second Fourier Transform step may comprise a Fast Fourier Transform of the type described in that text.

The method may be repeated for a set of 512 chirps for each cycle.

The method may of course be repeated for a series of cycles during operation of the radar apparatus.

According to a second aspect the invention provide a frequency modulated continuous wave (FMCW) radar apparatus comprising: an antenna array of N antennas, a processing unit which receives data captured from the antenna array and includes an area of fast local storage memory and a larger area of remote burst access memory, and a set of program or logic instructions stored in an area of memory that in use are executed by the processing unit wherein the method of the first aspect of the invention is carried out.

The antenna array may comprise a set of N antennas that receive reflected analogue signals that are fed into an analogue to digital convertor that converts the analogue signals to digital signals.

The apparatus may also include a transmitter array of N antennas that transmit a radar frequency signal away from the apparatus, the frequency being in the range that can be detected by the N antennas.

The apparatus processing unit may generate drive signals for the transmitter array or may configure a remote radar processing chip to generate the required radar signals.

According to a third aspect the invention provides a set of program instructions held in a memory of a processing unit of a radar apparatus which when carried out by the processing unit cause the radar apparatus to perform the method of the first aspect of the invention.

Other advantages of this invention will become apparent to those skilled in the art from the following detailed description of the preferred embodiments, when read in light of the accompanying drawings.

BRIEF DESCRIPTION OF THE DRAWINGS

FIG. 3 shows a sequence in time by which a pattern of data is transferred to the remote memory one burst at a time to build up a block of remote data;

FIG. 4 shows the final block of data stored in the remote memory;

FIG. 5 shows the source of the transfer of a first vertical strip of data from the remote memory back to the local storage memory for a second stage of FFT processing;

FIGS. 7 and 8 show the destination (in the local storage memory) results of FIG. 5 and FIG. 6.

DETAILED DESCRIPTION OF THE INVENTION

Figure 1:
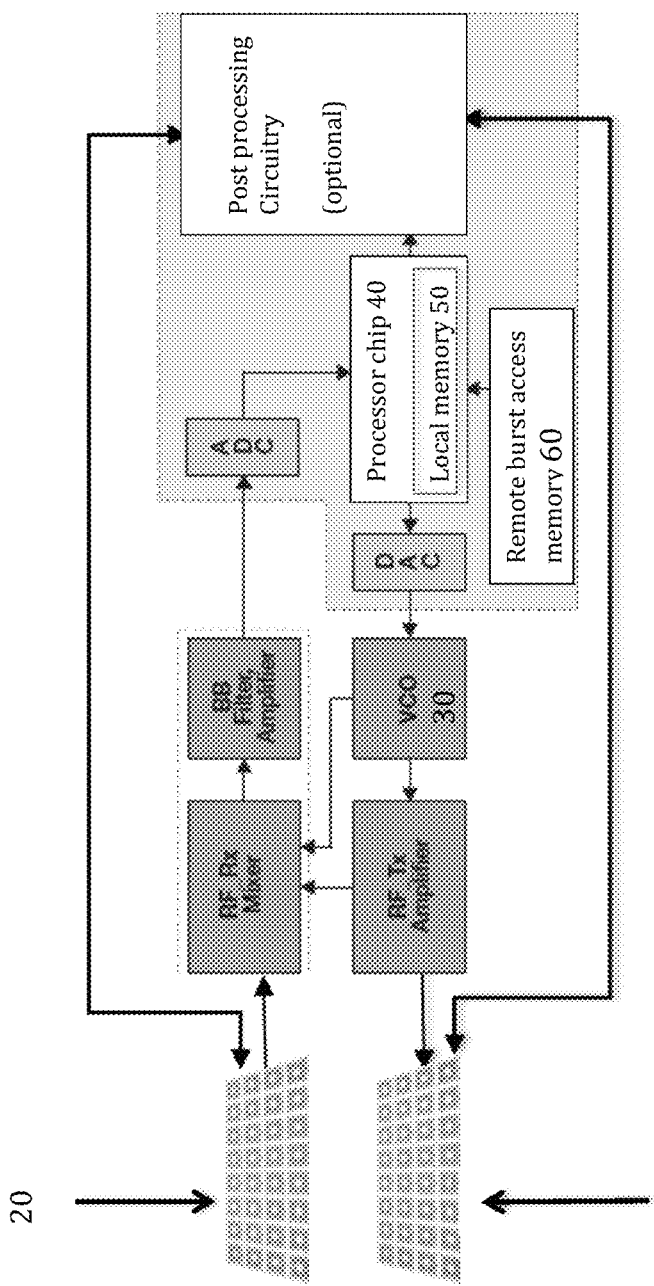
FIG. 1 is a block schematic of a radar apparatus in accordance with the present invention.

FIG. 1 shows an exemplary FMCW radar apparatus in accordance with the present invention. The apparatus comprises a transmitter antenna array 10 of N antennas, and a receiver antenna array 20 of N antennas. In this example there are 16 antennas, A0 to A15. The apparatus also includes a processing unit which transmits high frequency analogue signals to the transmit antenna array in the form of chirps and receives digitised data captured from the receiver antenna array. Between the processor of the processing unit and the transmit antenna is a VCO 30, and between the receive antenna and the processor is a RX mixer. The function of the VCO and mixer will be clear to the person skilled in the art.

The processing unit may include appropriate digital to analogue converter circuitry and analogue to digital converter circuitry as shown although more commonly the output of the radar antenna array 20 will already be in a digitised format. The A/D circuitry converts the received data from the mixer into a stream of data values. The processing unit includes a processor chip and an area of fast on-chip local storage memory 50. The processing chip 40 is encoded with a set of programmable logic instructions. The apparatus also includes an area of remote burst access memory 60. This is a memory that is slower to access than the local memory but is optimised for access in bursts, e.g. data of multiple byte length.

The skilled person will appreciate that the arrangement of the functional blocks shown in FIG. 1 is not intended to be limiting to the scope of the invention. The VCO and mixer could be implemented as part of the processing unit, and the A/D converter and D/A converter could be implemented outside of the processing unit.

FIG. 8 shows the steps carried out by the embodiment of a radar apparatus shown in FIG. 1.

In operation, the apparatus transmits a chirp of frequencies from the transmit antenna array and any echo signals that are reflected onto the receiver antenna array generate a corresponding set of data samples. In the described embodiment each chirp produces 1024 data points for each of the 16 antennas, so that in total there are 1024*16 data points generated for each chirp. The radar apparatus transmits multiple chirps for a single complete processing cycle, and in this embodiment a complete cycle is made up from 512 sequentially emitted chirps, C0 to C511. The antenna may be uniquely identified by a sequence of numbers from A0 to A15, and may be arranged spatially in this order in the antenna array.

Each data point for an antenna will correspond to a single voltage sample captured by the ADC and will have a value that indicates the amplitude of an echo signal detected by the antenna at the associated moment in time.

The combination of the number of samples in each chirp, the high number of chirps in each cycle and the number of antennas means there is a lot of data to process—of the order of 16 MB per radar cycle.

For each chirp, an FFT of the data is taken to produce a set of range bin results for each antenna. Because there are 16 antennas in this example then for each chirp there will 16 sets of range bin data produced. Each range bin set in this example consists of B individual range bins, where B is equal to 512, so that each range bin can be labelled uniquely as R0 to R511. Of course this is not intended to be limiting, as indeed the number of antenna in the array or number of data samples for each chirp is not intended to be limiting.

As will be explained, the apparatus takes an FFT for one chirp but does not need to wait for all the chirps to be processed before writing out some of the resulting range bin data to the remote memory. Each FFT creates a complete set of range bins R0-511.

In fact, as explained in the following paragraph in this described embodiment the data is written out each time a pair of range bins in the range bin set of the chirp have been calculated for every antenna. This corresponds to only 32 bins of data in total needing to be calculated by the FFT between each data transfer, corresponding to two set of 16 range bin values for each range bin, each value corresponding to one antenna.

In a first FFT processing stage, prior to writing out any data to the remote burst access memory, the data for the first chirp starts to be processed within the processing unit. The FFT generates for the first chirp all the range bin values R0-R511 for each of the 16 antenna. Taking advantage of the random access nature of the fast local storage memory the data is written into the local storage memory in a pattern which is beneficial for fast transfer of the data to the remote burst access memory. Specifically, the data is saved in the fast local storage memory with the values for each of the antennas range bin 0, then each of the antennas for range bin 1, etc.

Figure 2:
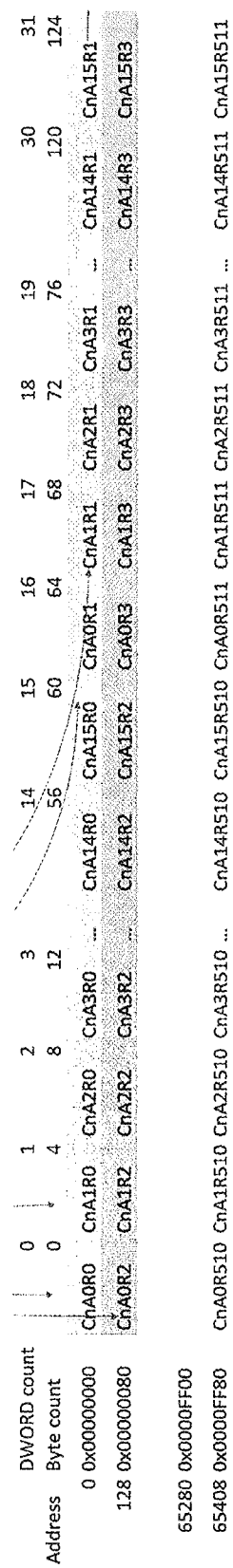
FIG. 2 is representation of the arrangement of data in the local storage memory for one chirp N=n showing how each data line stores the range data bin value for pairs of range data bins.

Each set of 32 values (2 range bins, 16 antennas) is in a contiguous data line. In the context of this description the term data line could also be interpreted as a 'data burst' i.e., the smallest efficient block of data which the remote burst access memory works with. This is shown in FIG. 2 for one chirp n where n is any integer value between 0 and the total number of chirps in a cycle.

Once the chirp has been processed and stored in the local storage memory, each line is then transferred across to the remote burst access memory as a single burst of data. This is possible because the length of the data line is the same as the minimum length of a single burst. By transferred we mean that the data in the local storage memory is written out to the remote burst access memory; it can remain also in the local storage memory until it is subsequently overwritten as it is no longer required for processing.

After the first data line has been transferred, each data line is transferred in sequence. This is transferred across to the remote memory. Importantly the second row is stored in the burst access memory at a position offset from the first row of data by a number C-1 rows, i.e. if the first data line is written into row 0 this is written into row 512. The subsequent bursts are also offset similarly.

This is repeated for all B/2 data lines needed to store the data making up the full 512 sets of range bin data for the first chirp.

The sequence of 512 individual data transfers for all of the data bins generated from the first chirp forms a pattern of data in the remote memory that is shown in FIG. 3 second column from the left.

The next chirp is then processed in exactly the same way and transferred one data line at a time to the remote memory. However, the start row position for writing data to the remote memory in the transfer is offset by one row to prevent this new data overwriting the data transferred for the first row. The resulting data stored in the remote memory is shown in FIG. 3 third column from the left.

This is repeated for each of the remaining 510 chirps, each time the offset being increased by one row. At the end a block of data will be formed in the remote burst access memory as shown in the drawings. It can be seen that the horizontal dimension of a data line in the remote data block is Antenna 0 to Antenna 15, twice . . . , once for even range bins and once for odd range bins. The vertical dimension has the data for range bins 0 and 1 stored in the first row and the subsequent rows and the data for range bin 2 and 3 offset from row 1 by 512 rows, for range bin 4 and 5 offset from row 1 by 2×512 rows and so on. At the end of the processing of the final chirp in the cycle there are no gaps in the block of data in the remote burst access memory. All the data relating to each pair of range bins is together in the remote burst access memory. This is shown in FIG. 3 far right column and also in FIG. 4.

Storing the data in the remote burst access memory in the pattern described above allows all the data for 2 Range bins to be easily bursted back into the fast local storage memory in a block of bursts or single long burst into a block of memory addresses in the local storage memory, allowing the a second stage set of FFTs to be done efficiently.

The data may be transferred back from the remote memory in the following manner.

Figure 5:
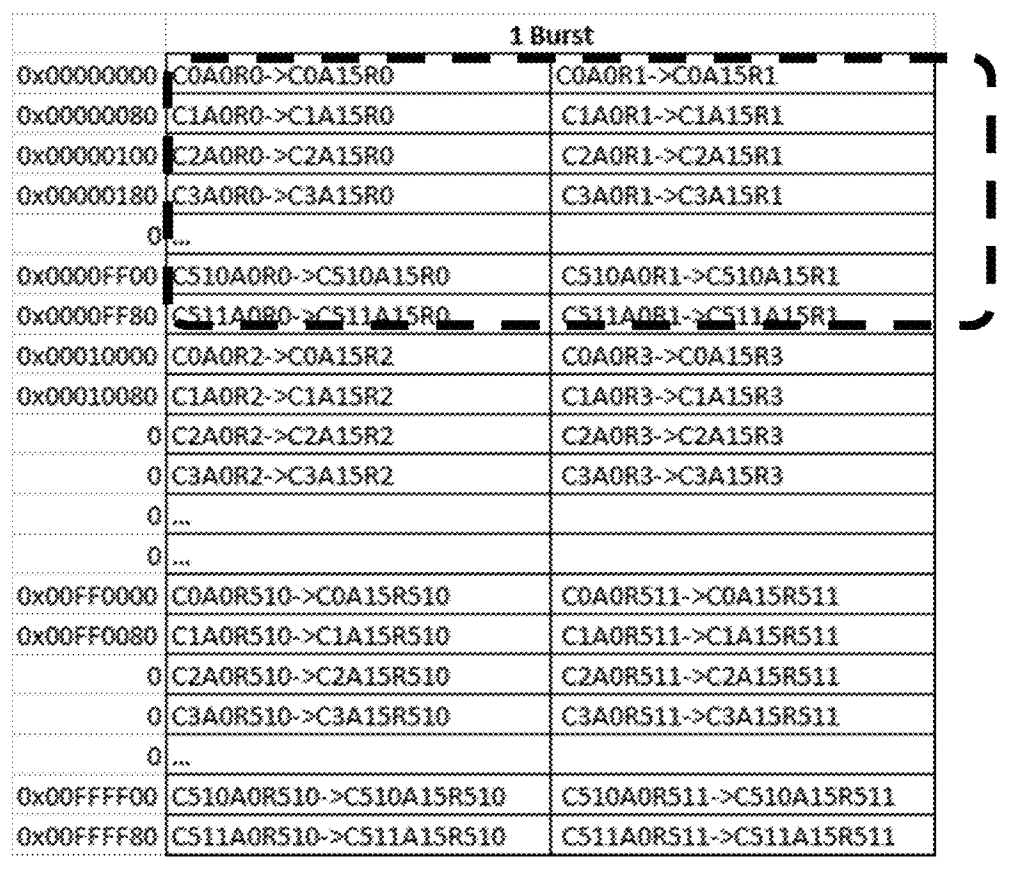

Initially, a whole block of data 512 rows long corresponding to range bins 0 and 1 is bursted (512 bursts) into the local storage memory. This data is processed by a second stage FFT which works vertically on Range bin 0 data on the left side of each data line. This data is then processed by the FFT working vertically on Range bin 1 on the right side of the data lines. This is shown in FIG. 5.

Further processing is then carried out on the so-called 'velocity-processed data'. This can take place in parallel with the reading in and FFT processing of the next pair of bins, but does not have to.

Figure 6:
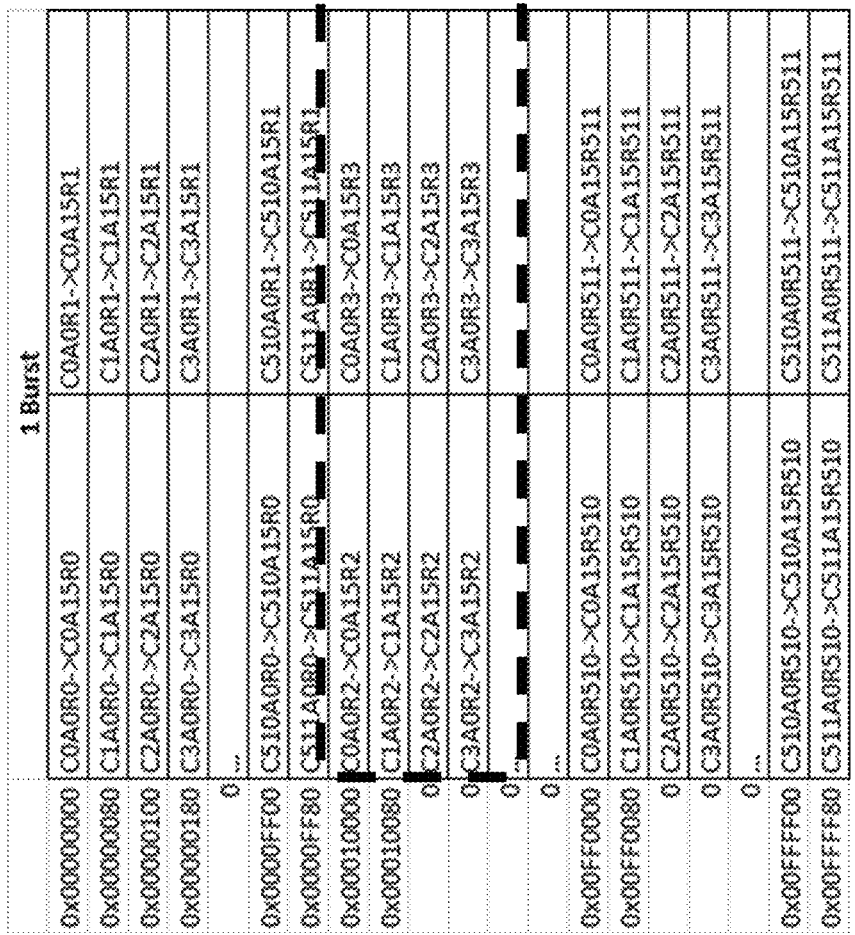
FIG. 6 shows the source of the transfer of a second vertical strip of data from the remote memory back to the local storage memory for the second stage of FFT processing.
Figure 9:
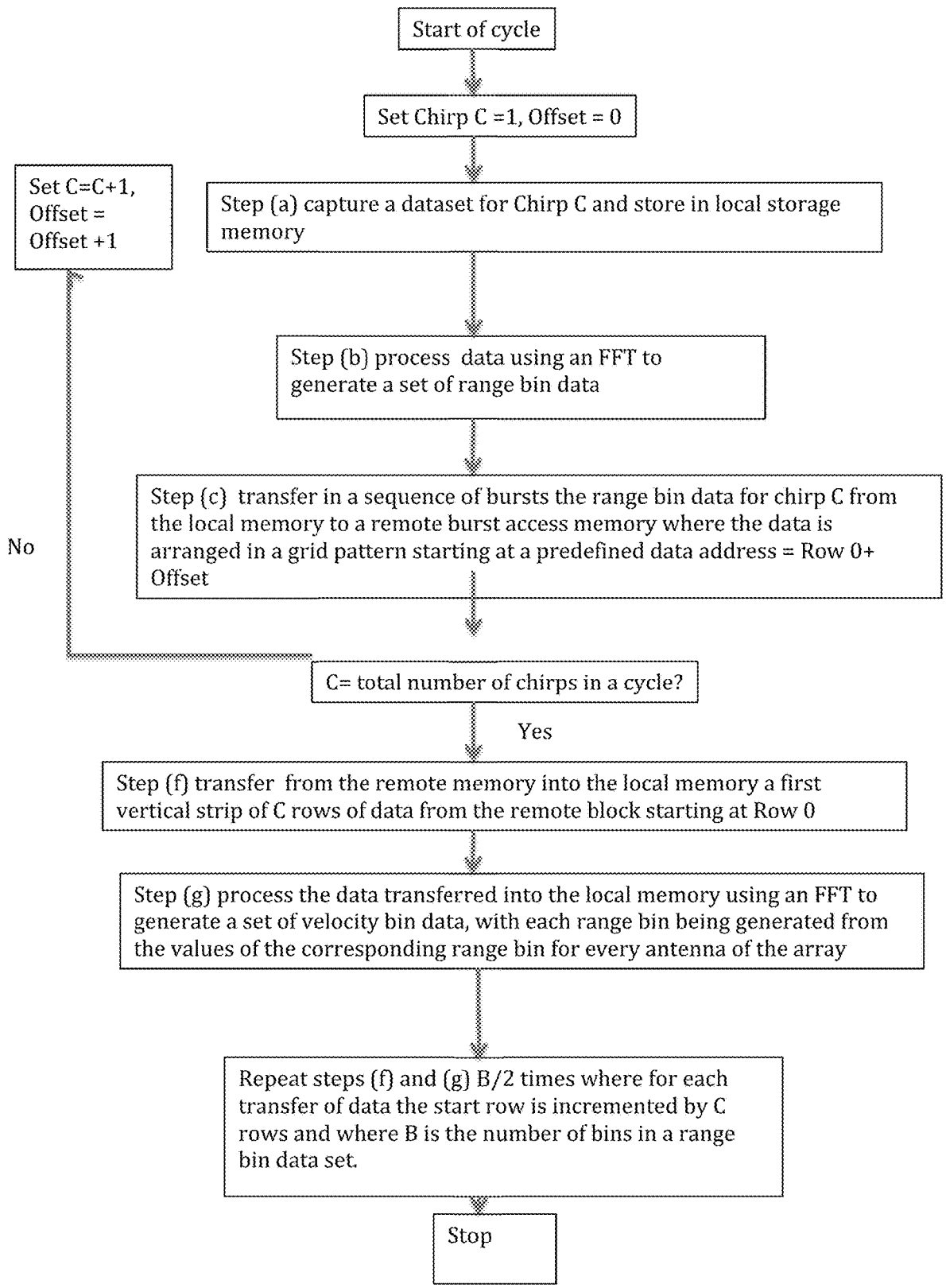
FIG. 9 shows the complete set of method steps carried out by the apparatus of FIG. 1 when processing one cycle of radar data.

After this has completed, then another block of data corresponding to Range bins 2 and 3 is transferred across in exactly the same manner as the first block. This data is processed by a second stage ITT which works vertically on Range bin 2 data on the left side of each data line. This data is then processed by the FFT working vertically on Range bin 3 on the right side of the data lines. This is shown in FIG. 6.

This is repeated for blocks corresponding to Range bins 4 and 5, and so on until the final range bins 510 and 511 are transferred across and processed to form velocity data.

The end results may then be processed some more and possibly also written back out to an external storage. Again this can be done in a long burst for the pair of results.

What is claimed is:

1. A method of operating a radar apparatus comprising an antenna array of N antennas, a processing unit which receives data captured from the antenna array and includes an area of local storage memory and a larger area of remote burst access memory, the method comprising for a single cycle of the radar apparatus comprising two or more chirps of transmitted radar frequency signal:
   (a) capturing a first chirp of data in the single cycle which generates data samples from each of the N antennas and storing the data in the local storage memory,
   (b) processing the captured data using a Fourier Transform to generate a set of range bin data, one for each of the N antennas, where each set of range bin data comprises range bins,
   (c) transferring in a sequence of bursts the range bin data for the first chirp from the local storage memory to a remote burst access memory where the range bin data is arranged in a grid pattern, the grid pattern comprising data filled rows containing two or more unique range bins of data for the first chirp held in a continuous strip of the remote burst access memory, the data filled rows being separated vertically from adjacent data filled rows by multiple rows which do not contain any bursts of range data associated with the first chirp, (d) repeating the steps (a) and (b) for each subsequent chirp of range bin data in the cycle, (e) repeating step (c) after the range bin data for each subsequent chirp has been stored in the local storage memory so as to transfer in a sequence of bursts the range bin data for each subsequent chirp of data from the local storage memory to the remote burst access memory where the data is arranged in the same grid pattern used for step (c) but offset vertically by one or more rows to fit within the rows in a column that have not been written with range bin data for any previously processed chirp in the cycle, (f) transferring from the remote burst access memory into the local storage memory, in one or more bursts, at least one continuous vertical block of range bin data from the remote block that has a length equal to the number of different range bins, (g) processing the range bin data transferred into the local storage memory using a Fourier Transform to generate a set of velocity data comprising a set of velocity bins where each velocity bin is generated from the values of the corresponding range bin for every antenna of the array, and (h) repeating steps (f) and (g) until all of the range bin data in the remote burst access memory block of data has been processed by the second FFT.

2. The method of claim 1 comprising in steps (c) and (e) store the range bin data in the burst access memory in chirp order when scanning vertically down the memory block whereby for each subsequent chirp the grid pattern is offset vertically by one row.

3. The method of claim 1 comprising transferring in steps (c) and (e) range bin data in bursts having a length of at least 2 bytes up to N bytes where N is an integer value less than the total number of antenna.

4. The method of claim 3 comprising in steps (c) and (e) transferring the range bin data as a sequence of bursts to form the grid pattern of data filled rows in the remote burst access memory, with each burst containing the range bin data for at least one respective pair of range bins of the range bin set, with the data for one range bin being written into a left part of the column in the grid and for the second range bin being written into a right part of the column.

5. The method of claim 1, in which steps (c) and (e) each comprise transferring the range bin data into a grid whereby all of the range bin data is held in a single column having a width equal to a burst length.

6. The method of claim 5 where there are range data bins and the method transfers the range data bins to the remote access memory arranged in a pattern so that after the range data bin for a cycle of chirps has been transferred all of the even range bin data is in the left hand side of a burst-sized data line in the remote block of range data bins and all of an odd range bin data is in the remote block of range data bin stored in a right hand side of the burst sized data line.

7. The method of claim 1 in which the range bin data transferred to the remote burst memory is stored in a pattern whereby the number of blank rows left between subsequent single burst line is equal to C−1 rows, where C equals the total number of chirps in a cycle, ensuring that all of the following repeats of steps (a) to (f) will interleave into the gaps without overwriting any of the previously transferred range bin data from step (c) or step (f).

8. The method according to claim 1 where N is greater than 2 whereby after all the range bin data has been transferred into the remote burst access memory the range bin data forms a block of data which has no blank rows, and in which scanning down a column of the block all of the data values for the antenna for a given range bin are stored sequentially.

9. A frequency modulated continuous wave radar apparatus comprising: an antenna array of antennas, a processing unit which receives data captured from the antenna array and includes an area of fast local storage memory and a larger area of remote burst access memory, and a set of program or logic instructions stored in an area of memory that in use are executed by the processing unit according to the method of claim 1 is carried out.

10. The frequency modulated continuous wave radar apparatus according to claim 9 in which the antenna array comprises a set of antennas that receive reflected analogue signals that are fed into an analogue to digital convertor that converts the analogue signals to digital signals.

11. A set of program instructions held in a memory of a microcontroller of a radar apparatus which when carried out by the microcontroller cause the apparatus to perform the method of claim 1.

* * * * *